United States Patent [19]

Thiele

[11] 4,110,642

[45] Aug. 29, 1978

[54] NOISE REDUCTION ARRANGEMENT IN A CLAW-TYPE DYNAMO ELECTRIC MACHINE, PARTICULARLY MULTI-PHASE AUTOMOTIVE-TYPE A-C GENERATOR

[75] Inventor: Hubertus Thiele, Ditzingen, Fed. Rep. of Germany

[73] Assignee: Robert Bosch GmbH, Stuttgart, Fed. Rep. of Germany

[21] Appl. No.: 771,805

[22] Filed: Feb. 24, 1977

[30] Foreign Application Priority Data

Mar. 3, 1976 [DE] Fed. Rep. of Germany ....... 2608689

[51] Int. Cl.² .................................. H02K 5/24
[52] U.S. Cl. ..................................... 310/51; 310/216; 310/259; 310/263
[58] Field of Search ................. 310/51, 257, 263, 171, 310/192, 216, 217, 254, 258, 259; 336/100

[56] References Cited

U.S. PATENT DOCUMENTS

| 2,235,903 | 3/1941 | Schonfelder | 310/51 |
| 2,235,905 | 3/1941 | Schonfelder | 310/51 |
| 3,171,996 | 2/1965 | Alger | 310/51 |
| 3,610,979 | 10/1977 | Thomas | 310/265 |
| 4,012,653 | 3/1977 | Shigeta | 310/51 |

Primary Examiner—R. Skudy
Attorney, Agent, or Firm—Flynn & Frishauf

[57] ABSTRACT

To reduce the noise level of operation and particularly cyclically recurring attractive forces between the rotor and the stator, the stator stack package is interrupted centrally by a sheet or strip of material different from electrical lamination sheet steel, for example a soft iron insert, or an insert of non-magnetic material such as a strip of bronze, brass, or insulating material.

6 Claims, 1 Drawing Figure

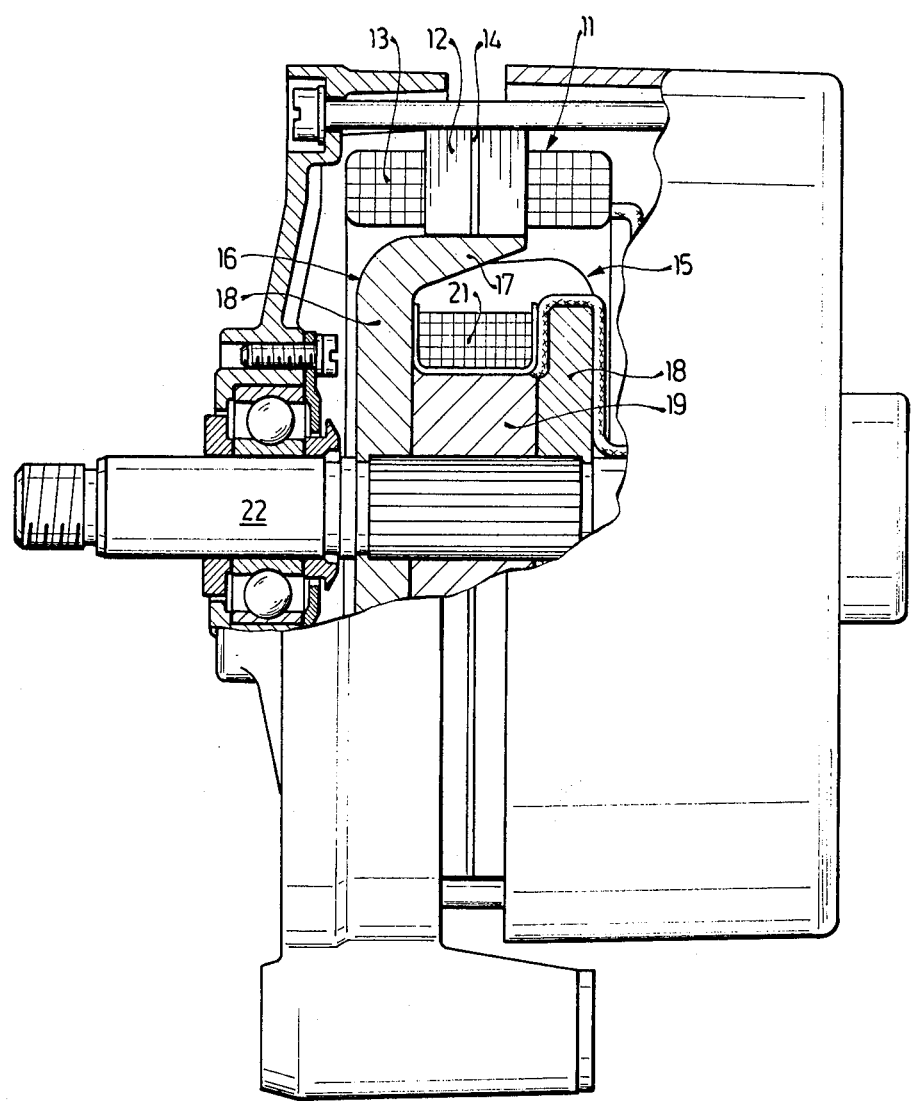

NOISE REDUCTION ARRANGEMENT IN A CLAW-TYPE DYNAMO ELECTRIC MACHINE, PARTICULARLY MULTI-PHASE AUTOMOTIVE-TYPE A-C GENERATOR

The present invention relates to dynamo electric machines, and more particularly to claw-type alternators especially for use as a-c generators in automotive vehicles.

Generators using claw-type rotors are particularly suitable as multi-phase alternators for use in the electrical supply of automotive vehicles. The stator pole system has magnetic flux applied thereof, derived from a rotating claw pole rotor. A steady field is generated in the claw pole rotor which, upon rotation of the claw pole rotor system, induces alternating voltages in the phase windings of the stator armature system.

Generators of this type, in operation, cause noise. The noise is generated by electromagnetic, attractive forces arising between stator and rotor which tend to cause oscillations of the stator-rotor system. The noise of operation has been reduced, with some success, by forming the claw poles with tapered or slanting terminal portions. It is, however, desirable to further reduce the noise level of operation, particularly the noise level of operation of alternators located in the engine compartment of an automotive vehicle so that the overall operating noise of the vehicle is reduced.

Subject matter of the present invention: Briefly, the stator assembly of the alternator which, as usual, contains a series of stacked lamellae of electrical sheet steel, customary for laminated electromagnetic structures, is interrupted approximately centrally thereof by an insert, similar to a lamella, but made of a material different from the usually used lamella material. This material may, for example, be of non-magnetic material, soft iron, or other materials which have characteristics substantially differing from those of the customarily used lamellae of the stack.

The axially directed stator flux is substantially reduced if the central element is made of non-magnetic material. This reduces the magnetic attractive forces between the stator and the shaft or rotating portions of the claw pole rotor. The claws of the claw pole rotor are, of course, extensions of the rotating shaft of the rotor itself. The forces which tend to cause oscillations, particularly oscillations of the stator, are thus reduced and the overall noise of operation is substantially decreased.

The central element may be made of soft iron or steel, for example, of such dimension and characteristics that eddy currents will arise therein. This also reduces the axially directed stator flux and, as above described, reduces the electromagnetically caused noises in operation of the dynamo electric machine.

The invention will be described by way of example with reference to the accompanying drawing, wherein the single figure is a schematic side view, partly broken away and in axial section, of a claw pole generator including the stator structure as described, in accordance with the present invention.

The generator has a stator pole system 11 having a stack of stator laminations 12. A phase winding 13 forming part of the armature is shown, surrounding the stator laminations. The laminations are made of customary and usual electrical lamination sheet steel.

In accordance with the present invention, a central lamella 14 is inserted in the stack of a material differing from that of the laminations 12. The central lamella 14 may consist of non-magnetic material such as brass, bronze, fiber board or plastic, or of a magnetizable material, such as soft iron or steel.

If the intermediate lamella is a magnetically responsive material, for example soft iron, then it should be substantially thicker than the lamination steel sheets which serve as laminations in the stack 12. The thickness should be such that it is matched to the claw pole type field structure to have eddy currents induced therein of sufficient intensity to decrease the magnetic flux concentration in the stator structure to a level which reduces the noise level of the machine when the machine is in operation. A typical thickness, for example, is twice the thickness of the laminations made of lamination steel sheet, and forming the remainder of the stator stack.

The field system 15 is rotatably mounted within the stator pole system 11. The field system 15 includes a claw pole rotor 16 having claws 17, end pole faces 18, a core 19 and an exciting or field winding 21. A shaft 22, suitably journalled in bearings in the end shields of the machine, supports the rotor system. The claws 17 are tapered at their ends, as seen in the figure.

Various changes and modifications may be made within the scope of the inventive concept.

A suitable lamination material for the stack 12 is, for example: normal sheet steel or dynamo sheet having a thickness of 1 mm. The central lamella 14 can be, for example, a strip of bronze of 1 mm thickness; or a strip of soft iron of 2 mm thickness, for example.

Inclusion of the strip 14 of different material, particularly if a non-magnetic material such as brass, or non-conductors, such as impregnated fiber board is chosen slightly decreases the power output, however only to a negligible extent; the decrease in power output is, usually, between one to three precent only, and thus not noticeable, although the decrease in noise level is apparent. The decrease in noise level, for any given type machine, will depend on the overall construction and arrangement of the machine.

I claim:

1. Claw pole-type dynamo electric machine having
   a stack of stator laminations (12) formed of dynamo electric machine lamination steel sheet material;
   armature windings (13) located on the stator stack;
   and a claw pole-type field structure (15) rotatably supported within the stator stack,
   comprising,
   means decreasing the axial stator flux concentration flowing through the stator laminations including an intermediate lamella (14) of a material different from said dynamo electric lamination steel sheet material positioned centrally within said stack forming the laminations thus decreasing the magnetic flux concentration in the stator structure, thereby decreasing the flux concentration at a central zone of the stack to reduce the noise level of the machine in operation by decreasing cyclically recurring attraction forces upon rotation of the claw pole-type field structure.

2. Machine according to claim 1, wherein the intermediate lamella (14) comprises non-magnetic material.

3. Machine according to claim 2, wherein the intermediate lamella (14) comprises a material selected from the group: brass, bronze, fibre, plastics.

4. Machine according to claim 1, wherein the intermediate lamella comprises soft iron.

5. Machine according to claim 1, wherein the intermediate lamella comprises a magnetically responsive material of a dimension and thickness matched to the claw pole-type field structure to have eddy currents induced therein of sufficient intensity to decrease the magnetic flux concentration in the stator structure to a level which reduces the noise level of the machine, in operation thereof.

6. Machine according to claim 5, wherein the intermediately located lamella comprises soft iron having a thickness of two times the thickness each of the laminations (12) forming the stator stack.

* * * * *